March 15, 1955 F. KESSLER 2,704,308
HOWLER CIRCUIT FOR TELEPHONE SYSTEMS
Filed May 14, 1952
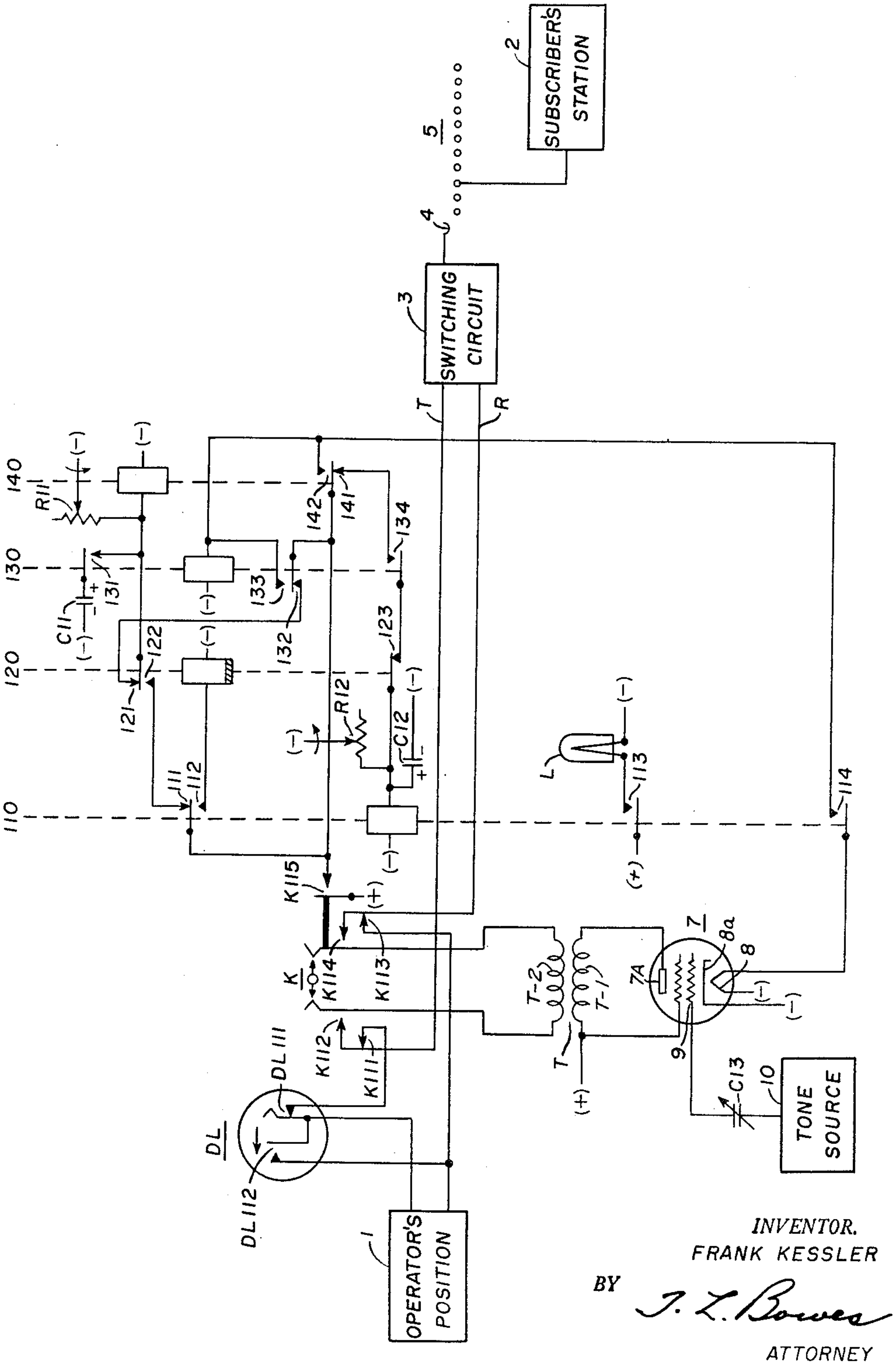
INVENTOR.
FRANK KESSLER
BY T. L. Bowes
ATTORNEY

United States Patent Office 2,704,308

Patented Mar. 15, 1955

2,704,308

HOWLER CIRCUIT FOR TELEPHONE SYSTEMS

Frank Kessler, Los Angeles, Calif., assignor to Stromberg-Carlson Company, a corporation of New York Application May 14, 1952, Serial No. 287,761

19 Claims. (Cl. 179—84)

This invention relates to telephone systems and more particularly to means for the application of howler tone to a subscriber's line conductors as an audible means for attracting the attention at a subscriber's station to an off-hook or unrestored condition of the receiver or handset.

In previous circuits of this type, the application of graduated howler tone was accomplished by hand control of the graduation means, or by automatic mechanical control which required a starting operation. The latter was also arranged for stopping at the end of the first cycle or for unlimited recycling of the graduated tone range, as desired.

It is an object of my invention to provide a new and improved graduated howler for telephone systems.

It is another object of my present invention to provide for the application of graduated howler tone without mechanical means, and which produces a gradual increase of tone without sudden increases from one step to a succeeding one.

The features which I believe to be novel are set forth in the appended claims. My invention itself, both as to its organization and manner of operation, together with further objects and advantages thereof, may best be understood by reference to the following description taken in connection with the accompanying drawing.

In the drawing, there are illustrated in block diagram form certain necessary components of an automatic telephone system embodying my invention, each of which may be entirely conventional and any components known in the art may be utilized for the designated functions and purposes of these blocks. Thus, a suitable operator's telephone position 1, may be connected to the line conductors T and R for control of a call to the subscriber's station 2 through suitable two-digit switching circuit means 3 in a manner well known in the art. The two-digit switching circuit 3 is preferably of the type which retains a transmission path between its incoming conductors and its output brushes, represented by the single brush 4, and through insulating capacitors to the subscriber's line conductors regardless of whether the called line is being used or is idle. The operator at the operator's position 1 may therefore listen in on a connection to the called line at any time, and may connect the howler tone to the line if conditions warrant.

There follows a detailed description of a call extended from the operator's station 1 to the subscriber's telephone or station 2, and the application thereto of a graduated howler tone.

The operator's circuit or position is shown directly connected to the switching circuit 4 without intervening switching means through line conductor T including normally closed contacts K111 of howler key K and DL–111 of dial DL, and line conductor R including normally closed contacts K113. Operation of the dial DL, for each of the two digits necessary to connect to the called line, shunts the operator's telephone circuit by operating contacts DL–112 during each digit, thereby eliminating pulsing clicks at the operator's headset, and intermittently opens the previously described loop circuit to the switching circuit 3 by operating the pulsing springs DL–111 in any suitable manner known in the art. At the completion of the dialing of the two digits, the operator's telephone circuit is connected to the called line through the previously described path through the switching circuit 3, brushes 4, one set of bank contacts 5, and the line conductors to the subscriber's station 2. For simplicity, only one brush and conductor is shown instead of the plurality normally used.

The operator may now operate howler key K if the application of howler tone seems to be required.

Operation of howler key K disconnects the loop holding circuit between the operator's position and the switching circuit 3 at now open contacts K111 and K113, and reconnects switching circuit 3 through operated contacts K112 and K114 to a loop holding circuit through winding T–2 of transformer TR. Any source of signal potential or tone connected through winding T–1 of transformer TR is repeated in winding T–2 and through the switching circuit 3 to the called line.

Operation of howler key K also effects the energization of relay 140 from ground (+) through operated contacts K115, normally closed contacts 132 and 121, and the winding of relay 140 to battery (−). In response to the operation of relay 140, relay 130 is energized from ground (+) through operated contacts K115 and 142, and the winding of relay 130 to battery. Relay 130, upon operating, closes a holding circuit for itself from ground through operated contacts K115 and 133, and its winding to battery.

Relay 130 is illustrated as being of the type in which contact 131 closes on the preliminary energization of relay 130, but the remaining contacts remain in their normal positions until relay 130 is fully operated. Thus, the preliminary closure of contacts 131 causes the charge of capacitor C11 from holding ground on normally closed contacts 132 during the interval before they open when relay 130 fully operates.

The full operation of relay 130 opens the energizing circuit for relay 140 at operated contacts 132 but relay 140 is held operated by the charge on capacitor C11. Relay 140 restores after a timing interval determined by the discharge time of capacitor C11 which is made variable by the setting of variable resistor R11. This resistor-capacitor combination, which shunts relay 140, is used to obtain a desired time interval for the decrease of the howler tone level.

Relay 140, upon restoring, completes a circuit for energizing relay 110 from ground through operated contacts K115, normally closed contacts 141, operated contacts 134, normally closed contacts 123, and the winding of relay 110 to battery. Capacitor C12, in shunt with relay 110, is charged by the same ground circuit which operates relay 110.

The operation of relay 110 lights howler lamp L from ground through operated contacts 113 and howler lamp L to battery in order to indicate the connection of howler tone to the line. Operation of relay 110 also connects ground through operated contacts K115, 133 and 114, to one terminal of filament or heater 8 of electron discharge device 7, the other terminal of filament 8 being connected to battery.

Since relay 130 is locked to ground through operated contacts 133, as long as howler key K is closed, heater or filament 8 is energized through contacts 114 whenever relay 110 is operated. The operate time of relay 110 is determined by the cycle time of relays 110, 120, and 140.

As is well known in the art, a discharge device such as tube 7 has a finite heating period before full conduction is reached and conduction gradually increases when the source of electron emission such as a filament or heater 8, and hereinafter referred to generally as a heater, is first energized and gradually decreases when the heater 8 is de-energized.

In accordance with the present invention, means is provided for periodically closing and opening the energizing circuit for heater 8, i. e., successive intervals of energization of the heater or filament 8 are applied so that conduction through tube 7 gradually builds up toward full conduction. Each successive energization contributes to the residual heat generated by preceding energizations. The slight cooling during each off period results in a slight decrease in conduction which results in a warbling, gradually increasing volume of tone.

Referring again to the energization of relay 110, the operation of relay 110 also effects the energization of relay 120 from ground through operated contacts K115 and 112, and the winding of relay 120 to battery. Relay 120, upon operating, opens the holding circuit for relay 110 and the charging circuit for capacitor C12, at normally closed contacts 123. Relay 110 restores after a timing interval determined by the discharge rate of the previously charged capacitor C12 through its coil winding. The timing is further controlled by the setting of variable resistor R12, which is used for obtaining the desired timing for the gradual increase of the tone level and for the subsequent application of the full tone for a desired time period.

Restoration of relay 110 opens the holding circuit for relay 120 at now-open contacts 112, to restore it after a delay interval due to its slow release characteristic. Restoration of relay 110 also reenergizes relay 140 and recharges capacitor C110, as previously described, from ground through operated contacts K115, normally closed contacts 111, operated contacts 122 while relay 120 is restoring, and winding of relay 140 to battery and through capacitor C11 to battery.

Relay 140, upon reoperating, opens the operating circuit for relay 110 and the charging circuit for capacitor C12 at normally closed contacts 141 so that relay 110 does not reoperate after relay 120 restores until relay 140 restores after its timing interval. The cycling sequential action of relays 110, 120 and 140, as previously described, now continues until howler key K is restored. Howler tone to the subscriber's telephone is applied in gradually increasing intensity with each subsequent application at a fixed tone level while relay 110 is operated and relay 140 is restored, and gradually diminished in intensity while relay 140 is operated and relay 110 is restored.

The maximum volume of tone applied to the called subscriber's receiver depends in part upon the tone signal applied to the input circuit to device 7 between cathode 8*a* and grid 9 of the tube. Variable capacitor C13 is shown as coupling a suitable source of alternating current or tone source 10 of predetermined frequency to the grid circuit of the howler tube 7. Increasing the value of this capacitance increases the signal applied to the grid or control electrode 9 and results in a greater volume of tone. Conversely, reducing the value of this capacitance results in a decreased volume of tone.

An output circuit is connected between output terminal or anode 7*a* of tube 7 and cathode 8*a* of tube 7 through winding T-1 of a suitable transformer TR so that the output of tube 7 is applied to leads T and R through K112 and K114 as previously mentioned.

From the foregoing explanation, it will be understood that the volume of the howler tone at subscriber's station 2 gradually and automatically increases until the filament 8 reaches a maximum temperature for the respective settings of resistors R11 and R12 and capacitor C13.

Restoration of howler key K removes ground from relays 110, 120, 130, and 140 to restore them to their normal positions. Reoperation of howler key K before relay 110 restores does not reconnect howler tone as ground from operated contacts K115 is not reconnected to relay 130 until relay 140 reoperates after relays 110 and 120 restore at the completion of the timing interval for relay 110. This preventive measure insures the initial application of howler tone at a low level so as not to be audibly objectionable if the subscriber is listening at the time the howler tone is connected.

From the foregoing it will be understood that the howler circuit described herein comprises a plurality of relays at least two of which, i. e., 140 and 110 are arranged to operate alternately or periodically whereby current is passed through heater 8 during those alternate periods when relay 110 is operated. Thus the conductivity of discharge device 7 is dependent upon the operation of relay 110. It will also be understood that both relays 110 and 140 are rendered slow-to-release by R—C networks, the release characteristics being determined by the time constants of these networks.

By proper choice of time constants, any desired rate of increase of the volume of the howler tone can be established. Thus, for example, if heating and cooling periods are equal, the volume cannot increase but if the heating time is slightly greater than the cooling time, so that a slight heat increment results during each heating period, the volume builds up very slowly. In this connection, it may be noted that the capacitor-resistor networks R11—C11 and R12—C12 comprise means for selectively determining the length of the periods of opening and closure respectively of the energizing circuit for heater 8.

While I have shown and described a particular embodiment of my invention, it will be obvious to those skilled in the art that changes and modifications may be made without departing from my invention in its broader aspects. For example, tone source 10 may comprise any suitable signal, such as conventional ringing frequency, and in one form of my invention may comprise a conventional ringing frequency generator. Moreover while I have shown a multi-element tube 7, it is within the scope of my invention to substitute a triode of the filament type or a diode in suitable cases. I therefore aim in the appended claims to cover all such changes and modifications as fall within the true spirit and scope of my invention.

What I claim is:

1. A tone generator comprising an electron discharge device having an output electrode and a source of electron emission, an output circuit connected to said electrode, means for causing electric oscillations in said output circuit, means for translating said oscillations into an audible tone, a circuit for energizing said source of electron emission, and means for periodically closing and opening said energizing circuit at a ratio of closing to opening times such that successive closures of said energizing circuit are of sufficient duration to gradually build up conduction through said discharge device between periodic cooling periods for said source of emission during the openings of said energizing circuit whereby said electric oscillations vary periodically in amplitude and cause said tone to have a varying pitch.

2. The tone generator of claim 1 in which said discharge device comprises a control electrode, together with a source of alternating current of predetermined frequency, and a variable capacitor coupling said source of alternating current to said control electrode whereby the volume of tone may be controlled.

3. The tone generator of claim 1 together with means for selectively determining the length of the periods of closing of said energizing circuit.

4. The tone generator of claim 1 together with means for selectively determining the lengths of the periods of opening of said energizing circuit.

5. The tone generator of claim 2 together with means for selectively determining the length of periods of closure, and means for selectively determining the length of the periods of opening of said energizing circuit.

6. In combination, an electron discharge device having an anode and a souce of electron emission, an output circuit connected to said anode, a circuit for energizing said source, means for periodically closing and opening said energizing circuit, means for selectively determining the length of the periods of closure of said energizing circuit, said periodic means comprising a relay having a pair of contacts in said energizing circuit, said closure determining means comprising a resistor-capacitor network shunting said relay, means for energizing said relay and charging said capacitor, and means for deenergizing said relay, the discharge time of said capacitor determining the time of release of said relay following its de-energization.

7. In combination, an electron discharge device having an anode and a source of electron emission, an output circuit connected to said anode, a circuit for energizing said source, means for periodically closing and opening said energizing circuit, and means for selectively determining the length of the periods of closure of said energizing circuit, means for selectively determining the length of the periods of opening of said energizing circuit, said periodic means comprising a relay having a pair of contacts in said energizing circuit, said closure determining means comprising a resistor-capacitor network shunting said relay, means for energizing said relay and charging said capacitor, and means for de-energizing said relay, the discharge time of said capacitor determining the time of release following the de-energization of said relay.

8. In combination, an electron discharge device having an anode and a source of electron emission, an output circuit connected to said anode, a circuit for energizing said source, means for periodically closing and opening said energizing circuit, said periodic means comprising a first relay having a pair of contacts in said energizing circuit, a first resistor-capacitor network shunting said first relay, a circuit for operating said first relay and charging said first network, a second relay having normally closed contacts in said operating circuit, a second resistor-capacitor network, means for energizing said second relay and charging said second network in shunt with said second relay, means responsive to the operation of said second relay for de-energizing said first relay, and means for de-energizing said second relay, said networks rendering said relays slow-to-release.

9. In combination, an electron discharge device having an anode and a source of electron emission, an output circuit connected to said anode, a circuit for energizing said source, means for periodically closing and opening said energizing circuit, said periodic means comprising a first relay having a pair of contacts in said energizing circuit, a first resistor-capacitor network shunting said first relay, a circuit for operating said first relay and charging said first network, a second relay having normally closed contacts in said operating circuit, a second resistor-capacitor network, means for energizing said second relay and charging said second network in shunt with said second relay, means responsive to the operation of said second relay for de-energizing said first relay, means for de-energizing said second relay, said networks rendering said relays slow-to-release, and means for selectively varying the time constants of said networks for rendering variable the release times of said relays.

10. In a telephone system, a line, a subscriber's substation connected to said line, a howler circuit including a source of signal, an operator's position, means controlled from said position for connecting said source to said line, said means comprising first, second, third and fourth relays, means responsive to control from said operator's position for operating said first relay, a first resistor shunting said first relay, means responsive to the operation of said first relay for operating said second relay, means responsive to the energization of said second relay for connecting a first capacitor in shunt of said first relay for charging said first capacitor and for opening the energizing circuit for said first relay whereby the discharge current from said first capacitor flows through said first relay and renders said first relay slow-to-release, the release time of said first relay being dependent upon the values of resistance and capacitance of said first resistor and said first capacitor, respectively, means responsive to the release of said first relay and the energization of said second relay for energizing said third relay, a second resistor connected in shunt with said third relay, a second capacitor connected in shunt with said third relay, said second capacitor being charged during the energization of said third relay, the discharge current of said second capacitor rendering said third relay slow-to-release, means responsive to the operation of said third relay for operating said fourth relay, said fourth relay being slow-to-release, means responsive to the operation of said fourth relay for interrupting the energization circuit for said third relay, whereby said third relay releases after a period determined by the values of capacity and resistance of said second capacitor and second resistor, respectively, means responsive to the release of said third relay for de-energizing said fourth relay, and means effective during the release time of said fourth relay and responsive to the release of said third relay for reoperating said first relay, whereby said cycle thereafter repeats.

11. In a telephone system, a line, a subscriber's substation connected to said line, a source of howler signal, said source comprising an electron discharge device having an output electrode and a source of electron emission, an operator's position, means controlled from said operator's position for connecting the output of said discharge device to said line, a circuit for energizing said source of electron emission, and means for periodically closing and opening said energizing circuit for periodically varying the conductivity of said discharge device.

12. In a telephone system, a line, a subscriber's substation connected to said line, a source of howler signal, said source comprising an electron discharge device having an anode and a source of electron emission, an operator's position, means controlled from said operator's position for connecting the output of said discharge device to said line, a circuit for energizing said source of electron emission, means for periodically closing and opening said energizing circuit for periodically varying the conductivity of said discharge device, and means for varying the respective open and closed periods of said energizing circuit.

13. In a telephone system, a line, a subscriber's substation connected to said line, a source of howler signal, said source comprising an electron discharge device having an anode and a source of electron emission, an operator's position, means controlled from said operator's position for connecting the output of said discharge device to said line, a circuit for energizing said source of electron emission, means for periodically closing and opening said energizing circuit for periodically varying the conductivity of said discharge device, and means for selectively determining the length of closure of said energizing circuit.

14. In a telephone system, a line, a subscriber's substation connected to said line, a source of howler signal, said source comprising an electron discharge device having an anode and a source of electron emission, an operator's position, means controlled from said operator's position for connecting the output of said discharge device to said line, a circuit for energizing said source of electron emission, means for periodically closing and opening said energizing circuit for periodically varying the conductivity of said discharge device, and means for selectively determining the periods during which said energizing circuit is open.

15. In a telephone system, a line, a subscriber's substation connected to said line, a source of howler signal, said source comprising an electron discharge device having an anode and a source of electron emission, an operator's position, means controlled from said operator's position for connecting the output of said discharge device to said line, a slow-to-release relay, means for periodically operating said relay, and means for energizing said source of electron emission during periods when said relay is operated and de-energizing said source of electron emission during periods when said relay is released.

16. In a telephone system, a line, a subscriber's substation connected to said line, a source of howler signal, said source comprising an electron discharge device having an anode and a source of electron emission, an operator's position, means controlled from said operator's position for connecting the output of said discharge device to said line, a slow-to-release relay, means for periodically operating said relay, means for energizing said source of electron emission during periods when said relay is operated and de-energizing said source of electron emission during periods when said relay is released, and means for adjusting the release characteristic of said relay.

17. In a telephone system, a line, a subscriber's substation connected to said line, a source of howler signal, said source comprising an electron discharge device having an anode and a source of electron emission, an operator's position, means controlled from said operator's position for connecting the output of said electron discharge device to said line, a relay, a capacitor shunting said relay, and a resistor shunting said relay, whereby said relay is made slow-to-release in accordance with the discharge characteristics of said capacitor-resistor network, means for periodically operating said relay, and means for energizing said source of electron emission when said relay is operated.

18. In a telephone system, a line, a subscriber's substation connected to said line, a source of howler signal, said source comprising an electron discharge device having an anode, a control electrode, and a heater, a source of tone signal connected to said control electrode, an operator's position, means controlled from said operator's position for connecting the output of said electron discharge device to said line, a relay, a capacitor shunting said relay, a resistor shunting said relay, whereby said relay is made slow-to-release in accordance with the discharge characteristics of said capacitor-resistor network, means for varying the time constant of the resistor-capacitor network in order to vary selectively the release time of said relay, means for operating said relay and means for energizing said source of electron emission when said relay is operated.

19. In a telephone system, a line, a subscriber's substation connected to said line, a source of howler signal, said source comprising an electron discharge device having an anode and a source of electron emission, an operator's position, means controlled from said operator's position for connecting the output of said electron discharge device to said line, a first slow-to-release relay, a second slow-to-release relay, means for operating said relays alternately, means responsive to the operation of said first relay for de-energizing said second relay, means responsive to the de-energization of said first relay for energizing said second relay, and means for energizing said source of electron emission during those periods when said second relay is operated and for de-energizing said source of electron emission during those periods when said second relay is released whereby the average conductivity in said electron discharge device is dependent upon the periods of operation of said second relay.

References Cited in the file of this patent

UNITED STATES PATENTS

| | | |
|---|---|---|
| 1,745,369 | Holden | Feb. 4, 1930 |
| 2,003,992 | Cockrell | June 4, 1935 |
| 2,068,106 | Horn et al. | Jan. 19, 1937 |
| 2,143,501 | Snyder | Jan. 10, 1939 |
| 2,256,117 | Keeley | Sept. 16, 1941 |
| 2,275,352 | Durante | Mar. 3, 1942 |
| 2,276,660 | Krom | Mar. 17, 1942 |
| 2,460,637 | Huge | Feb. 1, 1949 |
| 2,655,560 | Davison et al. | Oct. 13, 1953 |